US006880754B1

(12) United States Patent
Lie-Nielsen et al.

(10) Patent No.: US 6,880,754 B1
(45) Date of Patent: Apr. 19, 2005

(54) OBJECT CONTAINER AND LOCATION TRACKING SYSTEM WITH RANDOMIZED INTERNAL OBJECT STORAGE LOCATION

(75) Inventors: John Lie-Nielsen, Bradenton, FL (US); Tibor Szenti, Sarasota, FL (US)

(73) Assignee: HandyTrack Key Control Systems, LLC, Bradenton, FL (US)

( * ) Notice: Subject to any disclaimer, the term of this patent is extended or adjusted under 35 U.S.C. 154(b) by 26 days.

(21) Appl. No.: 10/449,286

(22) Filed: May 30, 2003

(51) Int. Cl.[7] .................................................. G06F 17/60

(52) U.S. Cl. ......................... 235/385; 235/381; 235/383

(58) Field of Search ................................ 235/385, 381, 235/383

(56) References Cited

U.S. PATENT DOCUMENTS

| | | | | |
|---|---|---|---|---|
| 4,771,897 A | * | 9/1988 | Ho | 211/85.9 |
| 5,038,023 A | * | 8/1991 | Saliga | 235/385 |
| 5,308,360 A | * | 5/1994 | Neitzke et al. | 221/197 |
| 5,801,628 A | | 9/1998 | Maloney | |
| 6,075,441 A | | 6/2000 | Maloney | |
| 6,131,808 A | | 10/2000 | Pires et al. | |
| 6,195,005 B1 | | 2/2001 | Maloney | |
| 6,204,764 B1 | | 3/2001 | Maloney | |
| 6,232,876 B1 | | 5/2001 | Maloney | |
| 6,244,507 B1 | * | 6/2001 | Garland et al. | 235/383 |
| D444,331 S | | 7/2001 | Maloney | |
| 6,262,664 B1 | | 7/2001 | Maloney | |
| D456,852 S | | 5/2002 | Maloney | |
| 6,392,543 B1 | | 5/2002 | Maloney | |
| 6,407,665 B1 | | 6/2002 | Maloney | |
| 6,424,260 B1 | | 7/2002 | Maloney | |
| 6,427,913 B1 | | 8/2002 | Maloney | |
| 6,431,438 B1 | | 8/2002 | Pires et al. | |
| 6,501,379 B1 | | 12/2002 | Maloney | |
| 6,505,754 B1 | | 1/2003 | Kenny et al. | |
| 6,592,028 B1 | | 7/2003 | Pires et al. | |

* cited by examiner

*Primary Examiner*—Michael G. Lee
*Assistant Examiner*—Seung H Lee
(74) *Attorney, Agent, or Firm*—Bryan W. Bockhop; Arnall Golden Gregory LLP

(57) ABSTRACT

A storage and location tracking system for objects, such as keys, with at least one storage container having a selectively accessible interior with a plurality of object holders therein, and each of the holders can store one or more objects. An access control tracks the storage and removal of objects from the plurality of holders and randomly assigns a holder for storage of objects such that an object is not consecutively stored at the same holder within the container.

20 Claims, 3 Drawing Sheets

OBJECT CONTAINER AND LOCATION TRACKING SYSTEM WITH RANDOMIZED INTERNAL OBJECT STORAGE LOCATION

BACKGROUND OF THE INVENTION

1. Field of the Invention

The present invention generally relates to securable storage containers and location tracking systems for objects stored in the container. More particularly, the invention relates to a storage container for objects, such as keys, that includes a location tracking system that randomly assigns the internal storage locations for the objects within the container to minimize the correlation of a specific object with a specific storage location.

2. Description of the Related Art

It is desirous to track the location and persons in possession of various objects of value, such as keys, computer disks, medicines, records, and other valuable items. Basic systems used to track objects have been log books kept in proximity to the object storage site, and a person signs the log book when he or she takes or returns an object from the storage location. However, this system is dependent on the person to actually use the log book and accurately record the data of who has the object and where the object is located.

With the advent of computerized record storage, computerized object tracking systems have been created, especially for tracking the location and storage of keys. These systems typically include a secure container or box that stores the keys, and a data input tracks the removal and return of the keys to the container. The data for the keys can be collected from a person taking the key, although this data input system is subject to the same error possibilities as log books. Some of the systems use a data store attached to an object, such as a bar code, or magnetic or optical strip, and the person simply scans the data at the time of object removal or return. This system is more likely to correctly gather data as the person can more easily scan the data at the appropriate times. Yet other systems use a radio-frequency (RF)-tag on the object such that the object can be tracked by external devices when that object is in a monitored space.

One problem that occurs in these automated tracking systems is that the person typically determines where to store the object at a specific storage location inside the container. In some systems, the person will choose the specific location to store the object, and in other systems, the system can tell the person which specific storage location to place the returned object. In the first instance, a person can purposefully place the object in the same location whereby the person can correlate the object with a specific location. If the objects are keys, the person can learn of the location of a key to a specific property which may be unwanted. And in the second instance, even if the system assigns the storage location to an object, the prior art systems do not ensure that the object was not recently previously stored at that location and object-location correlation is still possible.

Accordingly, it would be advantageous to provide a system and method that allows the storage of tracked objects, such as keys, at random locations within a secure storage container. Such system should minimize the likelihood that a person could correlate the identity of a particular object with a particular storage location. It is thus to the provision of such a system and method that the present invention is primarily directed.

SUMMARY OF THE INVENTION

The present invention is an object storage and location tracking system having at least one storage container that selectively provides access to one or more objects, such as keys, stored within its interior. A plurality of discrete and identifiable object holders are within the container, with each holder selectively storing at least one uniquely identifiable object, and each object is selectively stored at and removed from a holder. The system includes an access control that tracks the location of each object at any of the plurality of holders within the container and if an object is removed from a holder. The access control assigns one of the plurality of holders for storage of a specific object and directs the person using the system to place the object at that assigned holder. To minimize the risk of the person memorizing the location of a specific object; the control further randomly assigns a holder to an object such that the object is not consecutively stored at the same holder within the container. In one embodiment, the access control also can change the identifying data of the holders for greater security.

The method for preventing a correlation between a stored object and the location of a specific one of a plurality of object holders within a storage container includes the steps of inputting into the access control the identifying data of a uniquely identifiable object that is about to be stored at one of a plurality of object holders within the storage container, such as by swiping the bar code attached to a key. Then determining at least the prior object holder that stored that object, randomly assigning an object holder to store that object such that the object is not consecutively stored at the same holder within the container, and then storing the object at that assigned holder within the storage container.

It is therefore an object of the system and method to store tracked objects, such as keys, at random locations within the storage container to reduce the ability of a person to correlate the identity of a particular object with a particular storage location. The system and method accordingly creates a purposeful randomization of object storage with no additional input required from the person using the system.

Other objects, advantages, and features of the present invention will become apparent after review of the hereinafter set forth Brief Description of the Drawings, Detailed Description of the Invention, and the Claims.

DETAILED DESCRIPTION OF THE INVENTION

Figure 1:
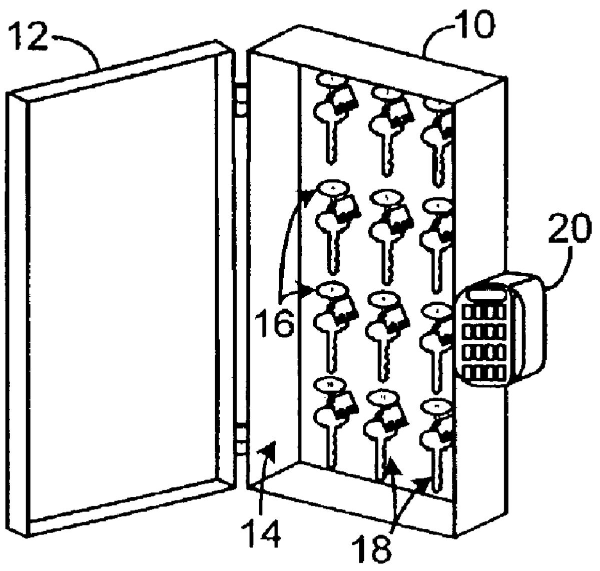
FIG. 1 is a perspective view of one embodiment of the object storage container and access control.

With reference to the figures in which like numerals represent like elements throughout, FIG. 1 illustrates an embodiment of the object storage and location tracking system with a storage container 10 having a door 12 to a selectively accessible interior 14 thereof such that the container selectively provides access to one or more objects, such as keys 18, stored therewithin. In the interior 14 is a plurality of discrete and identifiable object holders 16 with each holder selectively storing at least one key 18, and each key 18 is uniquely identifiable, such as with the bar code tag 30 in FIG. 3A. Thus, a person can store and remove one or more keys 18 from a holder 16 through use of the access control 20. Such key control systems are currently sold by HandyTrac® Systems.

Figure 2:
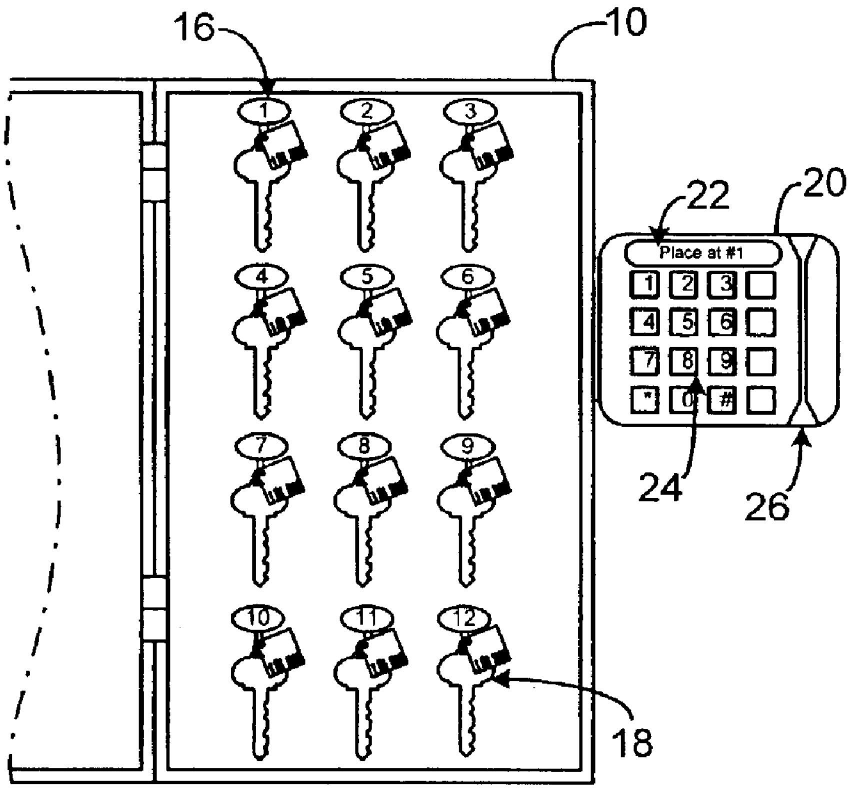
FIG. 2 is a front view of the keys in situ on the object holders within the container, and shows the access control for the container.

With reference to FIG. 2, the access control 20 tracks the location of each key 18 at any of the plurality of holders 16 within the container 10. The access control 20 can also track other data such at the identity of the person taking the key 18, the particular location of the key 18, and the time at which the key 18 was taken. The person taking the key can have some identifying indicia, such as a card with a magnetic strip or optical bar code that is scanned at the time of key replacement or removal. At the least, the access control 20 records if an key 18 is removed from a holder 16 and randomly assigns one of the plurality of holders 16 for storage of a specific key 18 that is being returned such that the object is not consecutively stored at the same holder 16 within the container 10. The access control 20 can purposely increase the number of replacements of the key 18 before allowing it placed on the same holder 16, e.g. not in the previous 3 locations, 4 locations, etc.

Figures 3A, 3B:
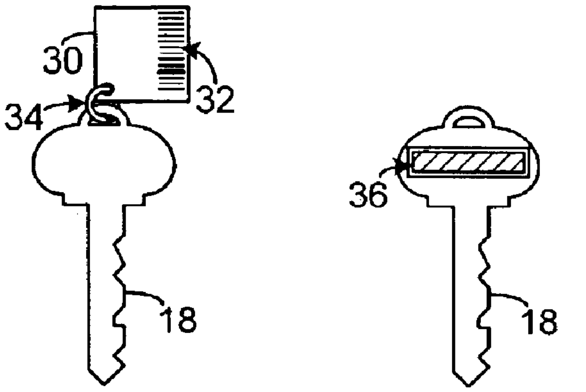
FIG. 3A is a perspective view of a key that is identifiable with an attached bar code tag.
FIG. 3B is a perspective view of a key that is identifiable with an attached magnetic strip.

While the stored object shown herein is a key 18, any other type of valuable object can be stored and tracked with the present system, such as computer disks, medicines, records, files, precious stones, jewelry, firearms, or any other valuable or restricted item, and the size of the container 10 and configuration of the holder 16 can be altered accordingly. As shown in the embodiment of FIG. 3A the object is identifiable through having an attached data store, such as a, bar code tag 30 with a scannable bar code 32, and the tag 30 is attached to the key 18 with a ring 34 as is known in the art. FIG. 3B shows an alternate embodiment of the data store as a magnetic strip 36 affixed to the key 18 though with an adhesive. Thus, to implement the system, one typically must attach a data store to the object to thereby identify the object, such as attaching the bar code tag 30 to the key 18. Other data stores such as flash memory, optical codes, and RF tags can be alternately used to identify the objects. Further, if the attached data store is a barcode 32, the access control 20 includes an optical reader 26 to scan the bar code 32 and obtain the data for the key 18. And if the attached data store is a magnetic strip 36, the access control 20 will include a magnetic reader to scan the magnetic strip 36 and obtain the object-identifying data.

To use the system, a person inputs the data for the key 18 being returned by swiping the bar code 32 of the key 18 into the reader 26 of the access control 20 such that the identifying data of the key 18 that is about to be stored at one of the plurality of object holders 16 is gathered by the access control 20. The person can also input any other necessary data, such as through keypad 24, such as the person's identifying data or other location information for the checked-out key, or can swipe their ID card and bar code or magnetic strip in the same reader 26 to input their data. The access control 20 determines at least the prior object holder 16 that stored that key 18 and then randomly assigns a new object holder 16 to store that key 18 such that the key 18 is not consecutively stored at the same holder 16 within the container 10. The access control 20 will then display to the person, at display 22, the specific holder 16 to place the key 18 at. The person will then store the key 18 at the assigned holder 16 within the storage container 10 and typically closes the door 12 securing all keys 18.

The taking of a key 18 typically will involve the input of the person's ID data, such as by swiping the card, and then inputting the desired key 18 to be taken. The access control 20 will tell the person the specific storage location of the desired key 18. When removing the key 18, the person may also input the data from that key 18, such through scanning the bar code 32 into the access control 20, to ensure the identifying data of that removed key 18. However, because the storage location for that key 18 was stored at the time of the key's storage, the access control 20 does not need to gather the information about the location that the removed key 18 was stored at.

As an example, if a person took a key 18 from holder #5 in the container 10, as shown in FIG. 2, upon scanning the bar code 32 to return the key, the access control 20 will not return that specific key 18 to position #5 until at least one more removal and replacement cycle of the key 18. The system could even use a larger interval, such as two or more cycles of the key 18 removal and replacement. Should another holder 16 be unavailable for the storage of the returning key 18 at a nonconsecutive holder 16, the access control 20 can ask the person to shuffle one or more keys 18 from other holders 18 to effect the random storage location and maintain security. Because the access control 20 tracks the current storage locations of the keys 18, such shuffling will not cause loss of tracking for any key.

Figure 4:
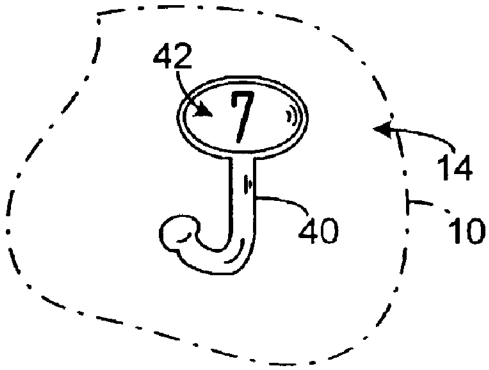
FIG. 4 is a perspective view of a numbered hook as an object holder within the interior of the storage container.

FIG. 4 shows one embodiment of the object holder 16, particularly suited for keys 18, with a hook 40 and a simple alphanumeric identifier 42 for that hook 40 at least proximate to the hook 40, if not integral therewith as shown in FIG. 4. There can be numerous hooks within the interior 14 of the storage container 10 and the hooks can also be placed on the inside of the door 12. Further, the object holders 16 can store a plurality of objects at each location, such as more than one key 18 being held on a specific hook 40. If so embodied, the access control 20 can track a plurality of keys 18 stored at each holder 16. Therefore, a person would be instructed to store a plurality of key 18 at one or more of the holders 16 and the presence or absence of a key 18 at the holder is not indicative of whether or not a key 18 may be stored there.

Figure 5:
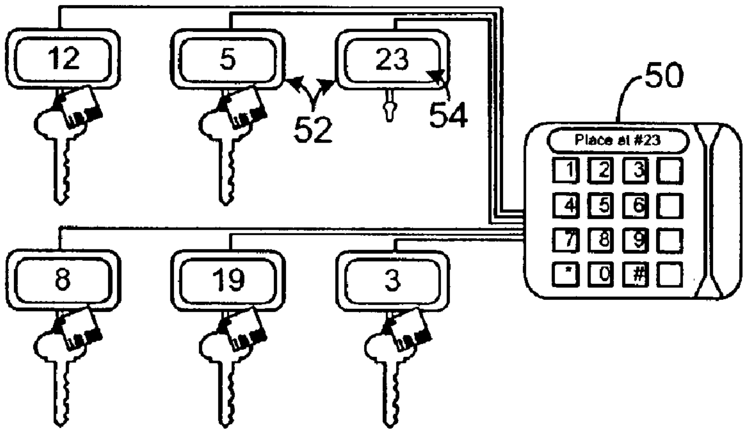
FIG. 5 is a pictorial view of an embodiment of the access control that also controls displays at the object holders and selectively changes the identification data at the holders to further minimize potential correlation of an object and specific storage location.

In another embodiment of the access control 50 and plurality of holders 52 shown in FIG. 5, the holders 52 each include a changeable display, shown here as an electronic display 54, proximate to the holder 52. The displays 54 are controlled by the access control 50 such that identifying data for each holder 52 can be randomly assigned by the access control 50, i.e. the number on the display 54 adjacent each holder 52 can be changed to create a random and non-sequential order to the holders 52. This embodiment therefore can randomly assign both the physical location to place the key 18 and the identification data for the holder 52. Thus, as shown, when the person placing a key 18 into the system is told by the access control 50 to place the key 18 at place #23, and the holder 52 designated as place #23 (display 54) can be any one of the holders 52. Thus, in implementing the system, the plurality of displays 54, which are proximate to each of the object holders 52, can be randomly assigned identifying data for each holder 52 through the access control 50 thereby altering the displays 54. It should also be appreciated that the access control 50 can change one or all of the displays 54 at any time because the person using the system will be directed to the specific holder 52 at the time of key 18 removal or storage.

Figure 6:
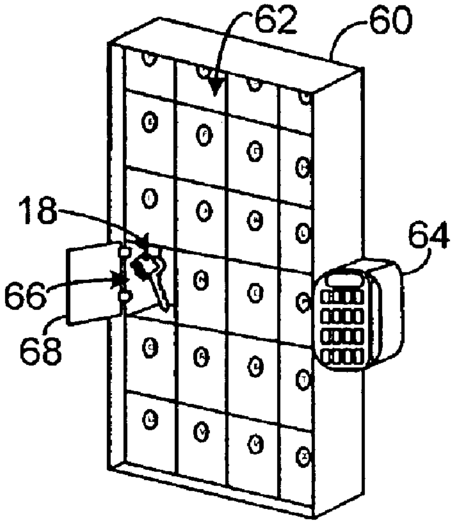
FIG. 6 is a perspective view of another embodiment of the storage container and access system with a plurality of object holding containers holding specific keys.

FIG. 6 illustrates another embodiment of the container 60 and access control 64 wherein the plurality of the object holders are discrete and identifiable holder-containers 62 within the storage container 60, and each of the holder-containers 62 has an accessible interior 66. Each holder-container 62 can selectively hold at least one object, such as a key 18 simply placed within the container 62. Each holder-container 62 includes a separate door 68 whereby the access control 64 opens the individual door 68 for the holder-container 62 such that one or more keys 18 can be placed in the interior 66 or removed therefrom. In such embodiment, the method of implementation of storage is storing the keys 18 within one of the holder-containers 62.

The identifying data for the holder-containers 62 is shown herein as alphabet letters on the exterior of each door 68. However, because the access control 64 opens and closes the doors 68 for access, there does not need to be any identifying indicia on the individual doors as the person will only be given access to the requested key within the specific holder-container 62, and the access control 64 stores the only data regarding the location of all keys 18 in the container 60. With the holder-containers 62 not identifiable to the person using the system and the random assignment of storage for keys being returned, the likelihood of correlation is greatly reduced, similarly to the embodiment of FIG. 5.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. An object storage and location tracking system, comprising:

at least one storage container having a selectively accessible interior thereof, the container selectively providing access to one or more objects stored therewithin, each object uniquely identifiable;

a plurality of discrete and identifiable object holders within the container, each holder selectively storing at least one object, and each object being selectively stored at and removed from a holder; and an access control that at least tracks the location of each object at any of the plurality of holders within the container and if an object is removed from a holder, the control assigning one of the plurality of holders for storage of a specific object, the control further randomly assigning a holder to an object such that the object is not consecutively stored at the same holder within the container.

2. The system of claim 1, wherein the object is a key.

3. The system of claim 1, wherein the object is identifiable through having an attached data store.

4. The system of claim 3, wherein the attached data store is a barcode and the access control includes an optical reader to scan the bar code and obtain the data for the object.

5. The system of claim 3, wherein the attached data store is a magnetic strip and the access control includes a magnetic reader to scan the magnetic strip and obtain the object data.

6. The system of claim 1, wherein at least one of the plurality of holders stores a plurality of objects and the access control tracks the plurality of objects stored at that holder.

7. The system of claim 1, wherein the holder is a hook with one or more alphanumeric characters proximate to the hook such that the hook is discretely identifiable.

8. The system of claim 1, wherein a plurality of the object holders include a plurality of displays each respectively proximate to a holder and the displays are controlled by the access control such that identifying data for each holder can be randomly assigned by the access control.

9. The system of claim 1, wherein a plurality of the object holders are discrete and identifiable holder-containers within the storage container, and the holder-containers selectively holding at least one object.

10. An object storage and location tracking system, comprising:

a storage means for selectively storing one or more uniquely identifiable objects;

a plurality of holding means within the storage means for storing a plurality of discrete and identifiable objects; and a control means for controlling access to the objects stored at the plurality of holding means, the control means at least tracking the location of each object at any of the holding means and assigning one of the plurality of holding means for storage of a specific object, the control means further randomly assigning a holding means to an object such that the object is not consecutively stored at the same holding means within the storage means.

11. A method for preventing a correlation between a stored object and the location of a specific one of a plurality of object holders within a storage container, comprising the steps of:

inputting into an access control the identifying data of a uniquely identifiable object that is about to be stored at one of a plurality of object holders within a storage container, the storage container having a selectively accessible interior thereof with a plurality of discrete and identifiable object holders, each of which selectively holds at least one object;

determining at least the prior object holder that stored that object;

randomly assigning an object holder to store that object wherein that object is not consecutively stored at the same holder within the container; and storing the object at the assigned holder within the storage container.

12. The method of claim 11, further comprising the step of tracking with the access control the location of each object at any of the plurality of holders within the container and whether an object is removed from an object holder.

13. The method of claim 12, further comprising the steps of:

removing an object from one of the plurality of object holders; and inputting into an access control the identifying data of that removed object.

14. The method of claim 11, wherein the steps of method store a key.

15. The method of claim 11, further comprising the step of attaching a data store to the object to thereby identify the object.

16. The method of claim 15, further comprising the step of scanning the data store to obtain the data for the object.

17. The method of claim 11, further comprising the step of storing a plurality of objects at one of the plurality of object holders.

18. The method of claim 11, wherein a plurality of displays are proximate to each of the object holders and further comprising the step of randomly assigning the identifying data for each holder through the access control altering the displays.

19. The method of claim 11, wherein a plurality of the object holders are discrete and identifiable holder-containers within the storage container, and the step of storing the object is storing the object within one of the holder-containers.

20. A method for preventing a correlation between a stored object and the location of a specific one of a plurality of object holders within a storage container, comprising:

a step for inputting the identifying data of a uniquely identifiable object that is about to be stored at one of a plurality of object holders within a storage container;

a step for determining at least the prior object holder that stored that object; and a step for randomly assigning an object holder to store that object such that the object is not consecutively stored at the same holder within the container.

* * * * *